United States Patent [19]
Gonnello

[11] Patent Number: 5,139,656
[45] Date of Patent: Aug. 18, 1992

[54] AQUARIUM FILTER

[76] Inventor: Scott W. Gonnello, 51 Sheri La., Agawam, Mass. 01001

[21] Appl. No.: 716,297

[22] Filed: Jun. 17, 1991

[51] Int. Cl.⁵ .......................................... A01K 63/04
[52] U.S. Cl. ................................. 210/151; 210/169; 210/416.2; 119/5; 248/231.4; 248/231.7
[58] Field of Search ............... 210/169, 416.2; 119/5; 248/214, 231.4, 231.7

[56] References Cited

U.S. PATENT DOCUMENTS

| | | | |
|---|---|---|---|
| 3,140,691 | 7/1964 | Stark | 119/5 |
| 3,141,442 | 7/1964 | Harris | 119/5 |
| 3,348,686 | 10/1967 | Spitzer | 210/169 |
| 3,477,679 | 11/1969 | Lovitz | 119/5 |
| 3,554,375 | 1/1970 | Willinger | 210/169 |
| 3,774,766 | 11/1973 | Brock | 210/169 |
| 4,684,462 | 8/1987 | Augustyniak | 119/5 |
| 4,907,772 | 3/1990 | Willinger | 248/231.7 |
| 4,988,436 | 1/1991 | Cole | 210/169 |

Primary Examiner—Peter Hruskoci
Assistant Examiner—Robert James Popovics
Attorney, Agent, or Firm—Ross, Ross & Flavin

[57] ABSTRACT

A filter apparatus for use with an aquarium tank comprises a filter housing with opposite front and rear walls and opposite end walls and a bottom wall defining an open topped construction. A hanger means is for suspending the filter housing in coplanar relationship with one of the aquarium tank walls. A J-shaped hanger clip defines a long leg extendable into the tank interior and a short leg extendable into the filter housing interior. Bolting is engageable through the short leg for bringing the wall of the tank and confronting wall of the filter housing into tightenable clamping position relative to each other. In the filter housing is an upper seat for upwardly supporting a splash box having an apertured bottom wall for water drainage and a filter compartment therebelow filled with a biological fiber wool for the filtering of the water charged thereinto and a return hose and complementary motorized pump for the return of the filtered water from the filter housing to the aquarium tank.

1 Claim, 3 Drawing Sheets

AQUARIUM FILTER

BACKGROUND OF THE INVENTION

1. Field of the Invention

The invention relates to aquarium filters and more especially to an external aquarium filter.

2. Description of the Prior Art

Servicing of an aquarium such as cleaning normally involves the removal of various parts of the aquarium and/or the filter therefor.

The present invention simplifies the work of servicing and leads to the happy result that cleanliness of the aquarium is more easily maintained.

The only seemingly pertinent prior art reference is U.S. Pat. No. 4,684,462 of Aug. 4, 1987 to George E. Agustyniak and he distinguishes from the present invention in the respect that he dictates the use of an open-topped overflow receptacle within his aquarium tank and a filtration apparatus externally of the tank which is divided into compartments by a vertical partition wall. His siphon tube transfers water from the bottom of his overflow receptacle within his tank to the bottom of the water receiving chamber of his filtration apparatus.

The advantage and improvements of the present invention over the devices of the prior art will become apparent from a review of the following recitation and accompanying drawings.

SUMMARY OF THE INVENTION

The invention is summarized as the combination of a conventional open-topped aquarium with a portable filtration apparatus unit which is adapted to be mounted relative to and supported by a vertical wall of any conventional aquarium tank.

The filtration apparatus allows the recirculation thereto of water from the aquarium tank for the filtration and aeration thereof, the apparatus being adopted for continuous removal of the tank water from below the top surface of the water and the continuous filtration and aeration thereof.

DESCRIPTION OF THE PREFERRED EMBODIMENT

Figure 1:
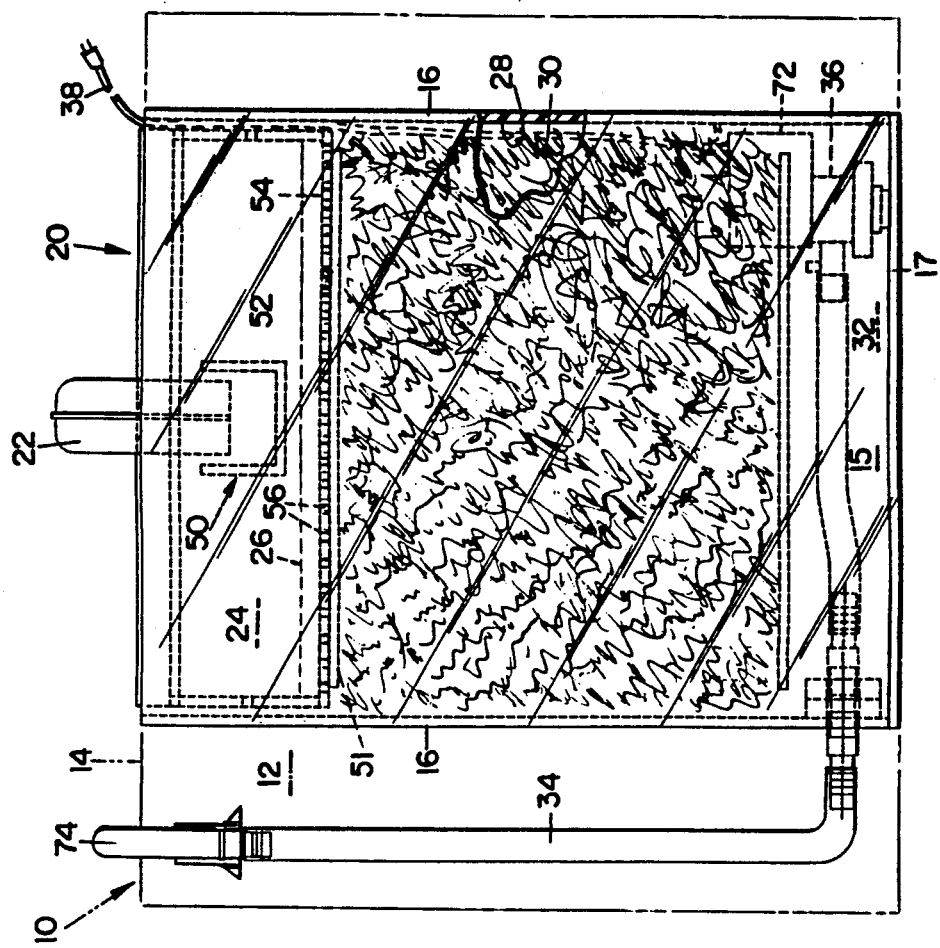
FIG. 1 is a view in front elevation of the filter of the invention shown in association with an aquarium tank.
Figure 2:
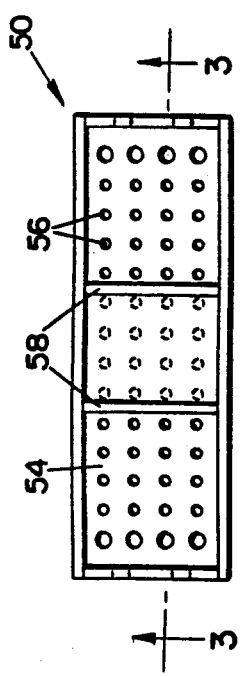
FIG. 2 is a view in top plan of the removable tray or splash box of the filter.
Figure 3:
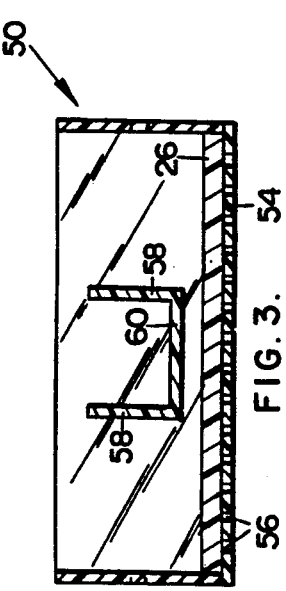
FIG. 3 is a sectional view on the line 3—3 of FIG. 2.
Figure 4:
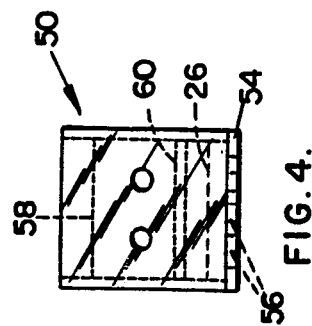
FIG. 4 is an end view of the FIG. 2 tray or splash box.

The filter apparatus of the invention is illustrated in the figures as shown as being removably hung from the upper rim 14 of one of the vertical walls 12 of an aquarium tank 10.

The filter housing containing the filter apparatus consists of opposite front and rear walls 15, opposite end walls 16, and a bottom wall 17 in the usual interrelated manner to define an open-topped structure.

The filter apparatus generally indicated by 20 consists of a siphon 22, a pre-filter compartment 24 and floss 26 therefor, a filter compartment 28 and filter wool 30 therefor, and a drainage compartment 32 and return line 34 associated therewith, the return line being powered by a power head 36 serving as a pump.

The pre-filter compartment 24 in the upper region of the filter housing and into which the siphon discharges the siphoned tank water is defined by a removable open-topped tray or splash box 50 which is nestably receivable within the filter housing and is supported by support bars 51 on the interior faces of each of front and rear walls 15 of the filter housing.

Figure 5:
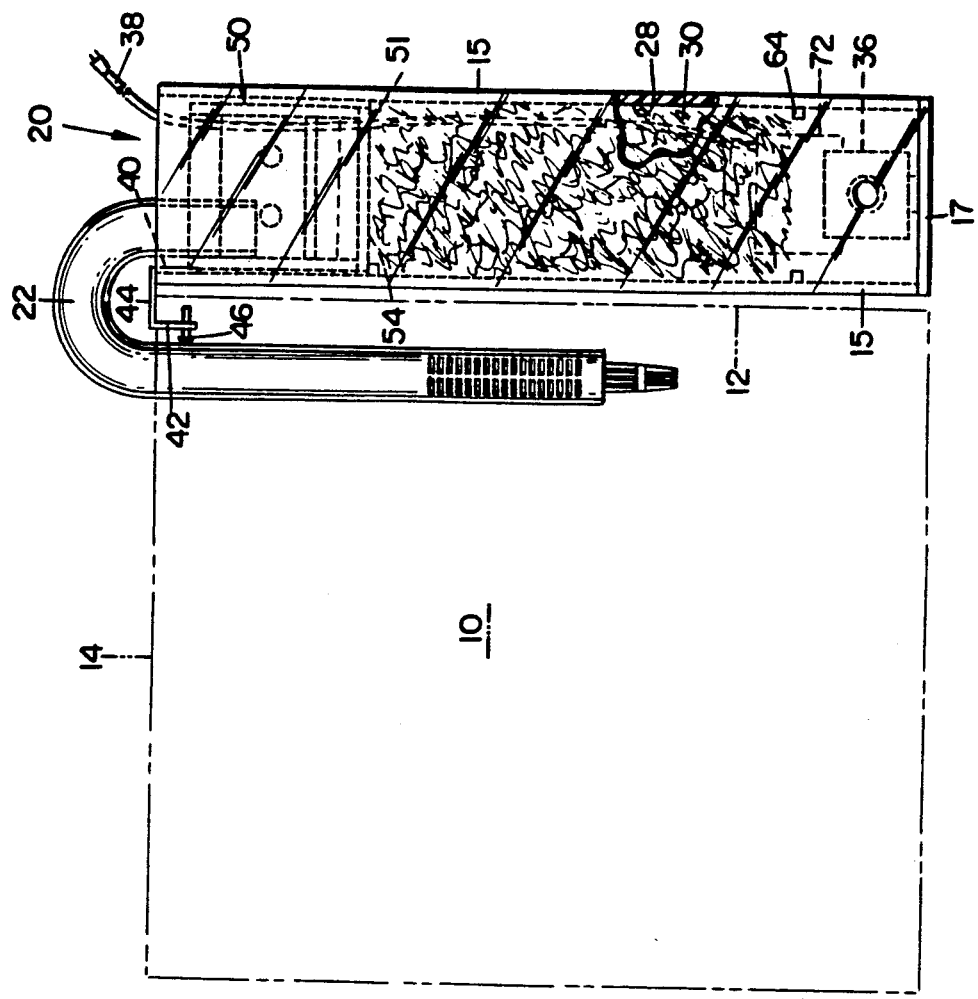
FIG. 5 is a view in end elevation of the FIG. 1 filter apparatus in association with an aquarium tank being shown in dash lines.
Figure 6:
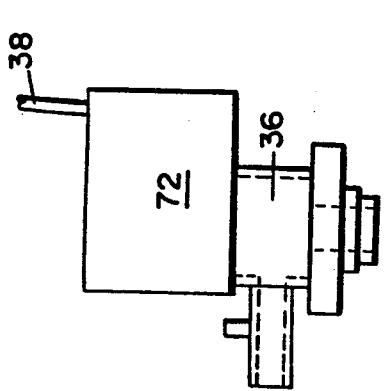
FIG. 6 is a front elevational view of the motor or power head of the invention.
Figure 7:
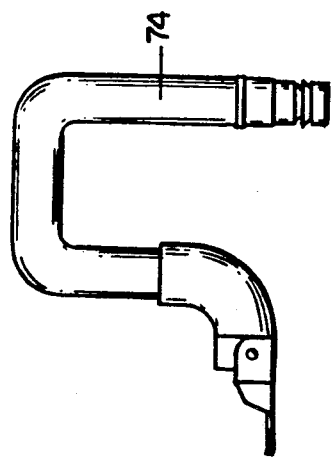
FIG. 7 is a front elevational view of the return tube elbow.

As shown in FIG. 5, the filter housing is further provided with an inverted J clip or hanger lip having one leg 40 disposed relative to the inside portion of rear wall 15 of the filter housing and another leg 42 disposed outboard of the housing in spaced relationship with wall 15 by means of a connecting arm 44, there being one or more tightening bolts 46 threaded through leg 42 so as to allow its being driven into a clamping position to bring rear wall 15 and the confronting wall of tank 10 into a tight and rigid coplanar relation.

The arrangement is such that the hanger lip allows easy accommodation of the filter apparatus to tank walls of different thicknesses.

The filter apparatus is thereby hung from aquarium tank rim 14 so as to be disposed in coplanar relationship therewith, and to permit bodily removal of the filter apparatus from operable engagement with tank 10 without disturbing the aquarium in any way. To effect such removal, the J-clip is loosened to allow an upward movement of the filter apparatus until the J-clip clears the wall of the tank and siphon 22, to be described, is manually removed from its operative position with respect to both aquarium tank and filter housing.

Siphon 22, of J shape configuration, has a long end extendable into the aquarium tank well below the water level in the tank and a short end extendable into the filter housing for siphoning tank water to the filter apparatus for the filtration and aeration thereof.

The pre-filter compartment, in the upper region of the filter housing and into which the siphon discharges its load of tank water, is defined by open-topped tray or splash box 50 which is nestably receivable within the housing walls.

The splash box seats upon opposite supports 51 on the interior faces of front and rear walls 15.

The bottom wall 54 of the splash box is provided with a plurality of drainage openings 56.

Within the splash box, centrally thereof and spaced upwardly of bottom wall 54 is a U-shaped construction defined by a pair of spaced side walls 58 which extend between the opposite front and rear faces of the splash box, which side walls are connected by an apertured bottom wall 60.

Thereby the central U-shaped configuration serves to receive the discharge mouth of siphon 22 so as to function as a distributor by means of which the tank water being charged thereinto is evenly distributed to opposite sides of the splash box, in each of which sides floss 26 may be placed for effecting an initial filtration of the tank water as it is flowed from the pre-filter compartment and its floss through the openings in the splash box bottom wall and into the filter compartment.

The tank water so prefiltered is thus allowed to drain downwardly into the filter compartment in which biological material 30 is loosely supported, there being a filter compartment bottom wall 62 which seats on supports 64 on opposite inner faces of front and rear walls 15, which wall serves to keep material 30 within the filter compartment.

The filtered water is collected in a return hose 70 with which a motor 72 connected so as to force the filtered water to be returned to the tank.

Return hose 70 is extended through a provided opening in an end wall 16 so as to allow a greater length of the hose to be easily manipulated for effecting return of the filtered water to the tank in any of a variety of locations.

The aquarium water, drawn into the filter apparatus by the siphon, filters down through the bed of filter material in the prefilter compartment, then through the bed of filter material in the filter compartment, and then into the return line where the pump provides the energy to return the filtered water into the aquarium via the return tube.

Figure 8:
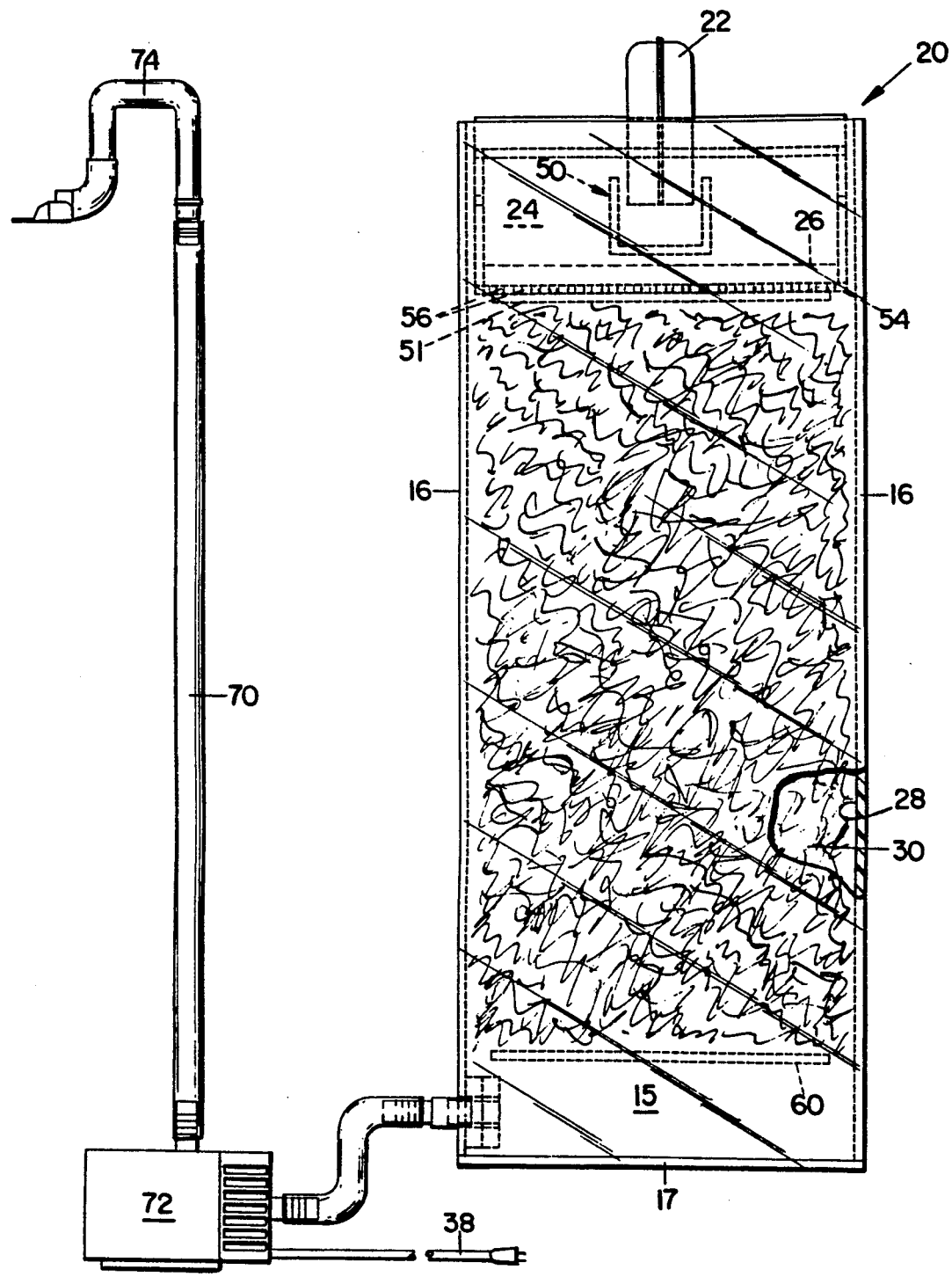
FIG. 8 is a view in front elevation of a modified form of the invention showing the motor or power head disposed outboard of the filter.

In FIG. 8, a modified form of the invention is disclosed wherein return hose 70 and motor 72 are shown as disposed outboard of the filter housing.

I claim:

1. In association with an open-topped aquarium tank containing a volume of water having a water level varying with the value of the volume, an aquarium filtration assembly for the continuous removal of the tank water from below the top surface of the tank water and the filtration and aeration thereof before the return thereof to the tank and comprising,
    a filter housing including interconnected opposite front and rear walls and opposite end walls and a bottom wall defining an open-topped container,
    hanger means for removably hanging the filter housing from the open top of the tank and in coplanar relationship with one of the aquarium tank walls by means of a U-shaped hanger clip having a first leg extendable into the tank interior and a second leg extendable into the filter housing interior and bolting threadedly engageable with the first leg for bringing the wall of the tank and confronting wall of the housing into a tightenable clamped position relative to each other,
    the filter housing being compartmented vertically into an uppermost relatively small pre-filter compartment and a lowermost relatively small drainage compartment and an intermediate relatively large filter compartment therebetween,
    a removable open-topped splash box having an apertured bottom wall and being nestably receivable within and spaced from the bottom wall of the prefilter compartment,
    a siphon having a relatively long arm extendable into the tank and below the water level thereof and a relatively short arm extendable into the splash box in the prefilter compartment for the siphoning of tank water into the splash box,
    a layer of floss disposed within the splash box for the preliminary filtration of the water charged thereinto prior to the flow thereof through the openings in the bottom wall of the splash box and into the prefilter compartment,
    an apertured horizontally disposed upper wall separating the prefilter and filter compartments,
    a charge of biological material loosely suspended within the filter compartment by the filter housing walls,
    a horizontally disposed lower wall separating the filter and drainage compartments,
    a return line communicating with the bottom of the filter compartment and extending through the lower wall for running through the drainage compartment and exteriorly thereof for extension to the tank,
    with the prefiltered water draining from the prefilter compartment through the apertures in the upper wall and into the filter compartment for filtration through the biological material therein and entry into the return line,
    a motor connected to the return line for forcing the filtered water in its return to the tank.

* * * * *